United States Patent [19]
Schilling et al.

[11] Patent Number: 5,332,886
[45] Date of Patent: Jul. 26, 1994

[54] SENSOR CORRECTING TEMPERATURE REGULATOR FOR ELECTRIC HEATING APPARATUSES

[75] Inventors: Wilfried Schilling, Kraichtal-Mü; Volker Brennenstuhl, Zaberfeld; Paul-Peter Wilhelm, Oberderdingen, all of Fed. Rep. of Germany

[73] Assignee: E.G.O. Elektro-Gerate Blanc u. Fischer, Fed. Rep. of Germany

[21] Appl. No.: 868,021

[22] Filed: Apr. 13, 1992

[30] Foreign Application Priority Data

Apr. 11, 1991 [DE] Fed. Rep. of Germany ....... 4111784

[51] Int. Cl.[5] .............................................. H05B 1/02
[52] U.S. Cl. .................................... 219/506; 219/497; 219/413; 219/505; 219/491; 374/170
[58] Field of Search ................. 219/10.55 B, 491, 497, 219/501, 506, 505, 412–413; 307/117; 374/170, 171

[56] References Cited

U.S. PATENT DOCUMENTS

| | | |
|---|---|---|
| 3,975,720 | 8/1976 | Chen et al. . |
| 4,504,922 | 3/1985 | Johnson et al. . |
| 4,523,084 | 6/1985 | Tamura et al. ...................... 219/497 |
| 4,978,837 | 12/1990 | Eggleston ........................... 219/497 |
| 5,111,027 | 5/1992 | Fowler ................................ 219/506 |
| 5,130,518 | 7/1992 | Merle ................................. 219/497 |

FOREIGN PATENT DOCUMENTS

| | | |
|---|---|---|
| 0291302B1 | 11/1988 | European Pat. Off. . |
| 2945681 | 5/1981 | Fed. Rep. of Germany . |
| 3031967 | 3/1982 | Fed. Rep. of Germany . |
| 3438920 | 4/1986 | Fed. Rep. of Germany . |
| 3528229 | 2/1987 | Fed. Rep. of Germany . |
| 3545108 | 7/1987 | Fed. Rep. of Germany . |
| 3702112 | 8/1988 | Fed. Rep. of Germany . |
| 3816761 | 12/1988 | Fed. Rep. of Germany . |
| 2219663 | 12/1989 | United Kingdom . |

Primary Examiner—Mark H. Paschall
Attorney, Agent, or Firm—Quarles & Brady

[57] ABSTRACT

An electronic regulator (12) for electric heating apparatuses, such as baking ovens (11), is equipped with a microcontroller (20), which contains in fixed programmed form the process data for the individual regulating functions. For adapting the real data of a temperature sensor (19) to the ideal conditions, e.g. in the center of a baking oven muffle (14) is provided a separate, non-volatile, but programmable memory (EEPROM) (26). It can be programmed from a personal computer (34) by means of a read-in connection (32), said computer determining the parameters by comparing the values of the standard temperature sensor (19) and separate temperature sensors (36) located at ideal points. The memory (26) can be differently programmed for individual operating modes.

9 Claims, 2 Drawing Sheets

SENSOR CORRECTING TEMPERATURE REGULATOR FOR ELECTRIC HEATING APPARATUSES

BACKGROUND OF THE INVENTION

In electric heating apparatuses, particularly in baking ovens and similar domestic heating and cooking apparatuses, temperature regulators are provided, which are intended to regulate the apparatus as a function of a temperature at a representative point or area. However, the latter rarely corresponds to the actual attachment possibility for a temperature sensor, so that the regulator must take account of divergences in the absolute temperature and the temperature characteristic. This means that the adjustment of the temperature regulator and preferably also its other characteristics must be matched for each specific application case.

OBJECT OF THE INVENTION

The problem of the invention is therefore to provide a regulator, which permits an easy and accurate adaptation to different operating conditions and in particular to different associations of the temperature sensor with the apparatus.

SUMMARY OF THE INVENTION

According to the invention this problem is solved by a regulator for electric heating apparatuses, such as baking ovens and the like, which has at least one temperature sensor associated with the electric heating apparatus, an electronic computer component and an input means for the same. There is also a programmable, non-volatile memory, a so-called EEPROM, for additional process data and a read-in connection for the input of the additional process data.

As a result of the memory, which is preferably provided separately from the computer component, a process control computer also known as a microcontroller, it is possible to store data, which supplement or modify the process data in the process control computer. Thus, e.g. the said memory can contain parameters for the starting and finishing values of the set point adjustment range and the connection between the set point and the temperature to be regulated at the location of the measuring sensor, e.g. in the form of a function or characteristic. It is in particular possible to separately input the same for several different operating states or conditions.

Without any action on the working programs provided in fixed manner in the process computer, inputting can take place by means of the read-in connection, which can simultaneously be the connection for the normal input or display elements. For example, inputting can take place by means of a normal personal computer (PC), i.e. a commercially available industrial standard computer, either by manual inputting of a calculated value, by the automatic copying of previously determined values or, as a separate aid in the determination of additional process data, by means of a temperature measuring device connected to the personal computer. It is e.g. possible there to connect a temperature sensor, which is located at the ideal point for the temperature measurement, e.g. the muffle centre or centre of gravity of the baking oven. The personal computer can then compare the display of this auxiliary temperature sensor with that of the normally displayed means and can determine the corresponding correction data both for the absolute level and for the characteristic, optionally also for the heating and cooling characteristics, so that the latter can be fed into the memory by means of the read-in connection.

If in a series the same conditions continuously prevail, this can only be carried out on specific testing devices and the thus determined values can then be copied into the memory. However, due to the simplicity of this measurement, it is also possible during the final control to provide each apparatus with its specific values. This input could then take place instead of the normal adjustment of the regulator. Intermediate solutions are also conceivable, e.g. a sampling inspection during quality control with in each case, optionally automatically performed taking account (feedback) during further mass production.

It is in particular also possible to take account of different operating conditions within a single apparatus, which often require or cause different control characteristics, e.g. in a baking oven, in which are provided in switchable manner normal overheat/underheat operation, circulating air and grill. Due to the different heat transfer conditions the adaptation of the real value display of the fixed installed temperature sensor differs considerably compared with the actual temperature conditions in the muffle centre of gravity. Thus, for these different operating modes of the same apparatus different data sets can be fetched from the memory and used for process computer adaptation.

It is particularly advantageous that the same regulator with the same computer component (process computer) can be used in a fixed programming for the most varied apparatuses. This makes it possible to significantly reduce the multiplicity of regulator types, whereas hitherto even for the same apparatus types (e.g. baking ovens) and within the latter for different variants, e.g. having a different muffle insulation, it was necessary to use different regulators or to especially adapt them, usually with a not completely satisfactory result.

It is also possible to use the memory for storing data of different programs, e.g. for different products to be baked.

It is also possible to connect further temperature sensors, e.g. an optionally usable core temperature sensor for the product being baked and this can be taken into account in the data sets.

BRIEF FIGURE DESCRIPTION

These and other features can be gathered from the claims, description and drawings and the individual features, both singly and in the form of random subcombinations, can be realized in an embodiment of the invention and in other fields and can represent advantageous, independently protectable constructions for which protection is hereby claimed. An embodiment of the invention is described in greater detail hereinafter relative to the drawings, wherein show:

FIG. 1 a block circuit diagram with a baking oven and a temperature regulator.

FIG. 2 a graph with different curves.

DESCRIPTION OF A PREFERRED EMBODIMENT

Figure 1:
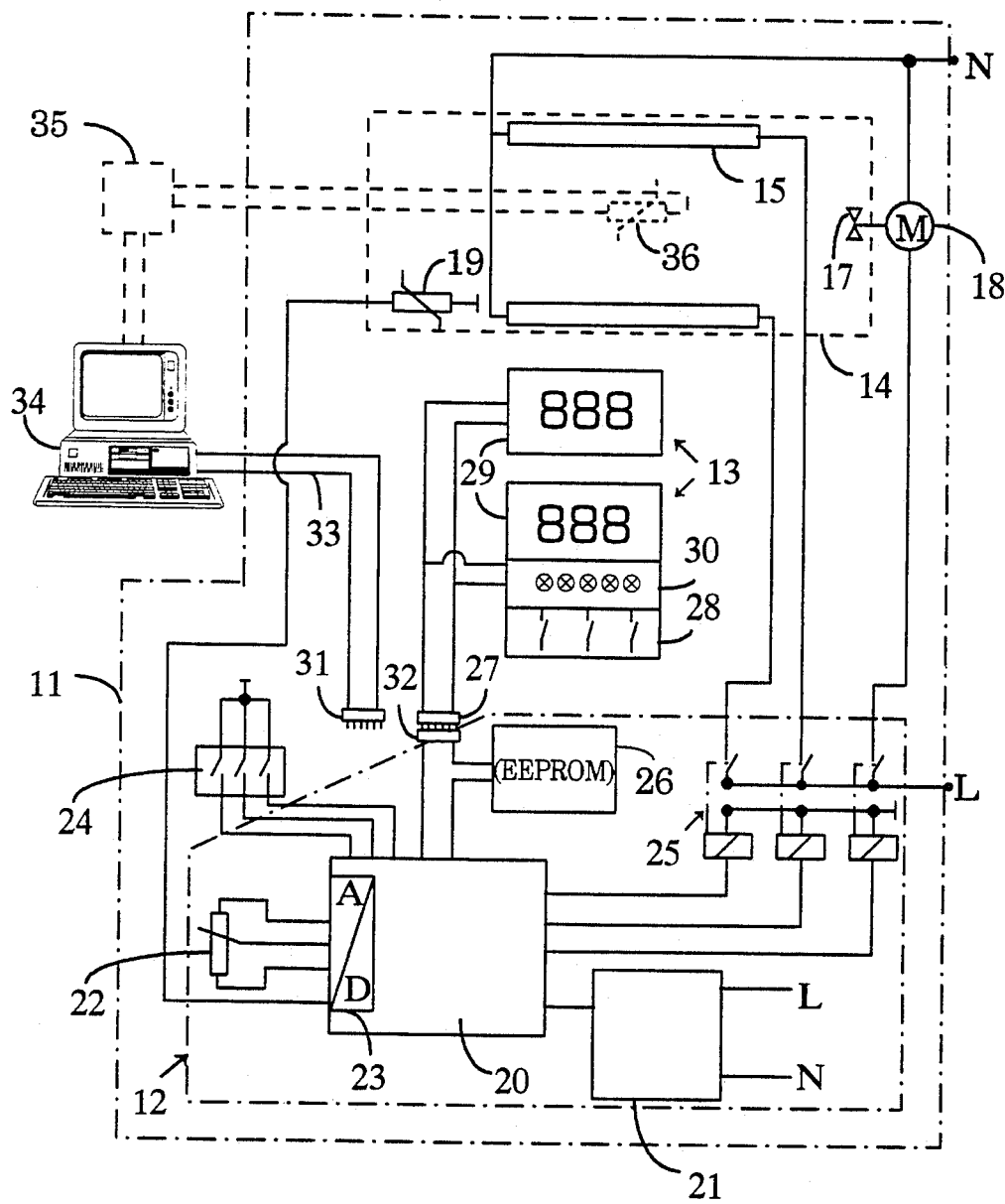

FIG. 1 diagrammatically shows a baking oven 11 and an associated regulator 12 with input means 13, which usually also contain display functions. The baking oven has a muffle 14 and in the present embodiment it contains two electric heating resistors for overheat and underheat heating means 15,16. There is also a fan with an associated motor 18 for circulating air heating. The baking oven muffle 14 also contains in fixed manner a temperature sensor 19 located in the vicinity of one of the walls, because the interior of the muffle must remain free for the product being cooked.

The regulator 12 is a temperature regulator, whose main regulating element is a computer component 20, which is constructed as a process control computer or microcontroller. It is supplied by a power supply unit 21, which is connected to the domestic mains L-N and receives its input values on the one hand from the temperature sensors 9 and a set point adjuster 22 via an integrated analog-digital converter 23 and on the other hand from input means 13, as well as an operating mode selector 24. The output signals of the computer component control the coils of the power relays 25, which can also be formed by other components, e.g. Triacs. In the embodiment there are three power relays 25, applying the mains voltage L-N, as desired, to overheat 15, underheat 16 or fan motor 18.

With the computer component 20 is also associated a non-volatile memory 26 (F. EPROM). The latter is a programmable electronic memory, which permanently stores data, i.e. without a constant voltage supply. It is connected to the same data line which connects the display and the input means 13 to the computer component 20 and which is constructed as a data bus. The regulator contains a plug socket 32, to which is connected a corresponding attachment plug 27 on the data bus to the input and display means 13 and consequently form a read-in connection 27,32. The display and input means 13 e.g. contain input keys 28 for temperature and time values, which are displayed on the displays 29, whilst function displays 30 are also provided.

FIG. 1 also shows that in place of the input and display means 13, by means of the plug socket 32 it is also possible to connect a plug 31, which is provided on a line 33, which leads to a read-in or input unit 34, e.g. a conventional personal computer (PC). Thus, from the PC 34 data can be read into the memory 26 and permanently stored there.

To the read-in unit (PC) 34 can be connected a temperature measuring device 35, which is connected to a temperature measuring sensor 36 (shown in broken line form). The latter is freely movable and can correspondingly also be placed in the baking oven muffle.

The method for setting up and operating the represented baking oven will now be described. A baking oven with a regulator 12, which has in the computer component 20 fixed programmed regulator data (starting/end values and characteristic curves), is connected to the read-in unit 34, in that the socket 32 is connected to the plug 31. The one or more temperature sensors 36 are then located at an as representative as possible a point for the temperature of the baking oven muffle 14, e.g. in the thermal centre of said muffle. It is also possible to provide loads, e.g. a "sample baking product". The PC 34 consequently retains temperature values, which correspond to the precise real temperature of the electric heating apparatus to be adjusted by the regulator. By means of the data bus it also receives from the computer component 20 the temperature values simultaneously determined by the standard temperature sensor 19. Thus, by comparing these values it is possible to establish the difference between the desired real temperature and the temperature actually subsequently established in operation on the temperature sensor 19. If this measurement is carried out in different representative operating states of the baking oven, then in the PC 34 as a result of a corresponding evaluation program, it is possible to determine the parameters which are required for supplementing or modifying the standard data on which the computer component 20 is based, in order to supply the latter with the precise real values or those ideal for the regulator function. Thus, in principle they are correction values, but which can differ as a function of the operating state.

For this purpose this adaptation can be carried out with in each case a new input of corresponding data sets in the memory 26 for the different operating modes of the oven, which are selected by means of the operating mode switch 24 (e.g. normal, circulating air and grill operation, etc.).

After these parameters have been filed in the memory 26 and are fixed programmed in there, the plug 31 can be interchanged with the plug 27, so that now the number input and display panels 28,29,30 can be reconnected and the baking oven can be put into operation. Thus, e.g. a specific operating mode is set on the operating mode switch 24 and a particular temperature and time are inputted by means of the input keys 28. By a corresponding control of the relays 25, the regulator releases the heating systems, fan motor or other active components. Thus, the temperature regulator can e.g. be set up for timing power release and can e.g. rapidly approach a given set temperature with full power release and then can further approach the same with a clock, i.e. with pulsewise power release and then in timed manner retain this temperature so as to achieve minimum control fluctuations.

In accordance with the set operating mode, a corresponding data set is fetched from the memory 26 and supplements or corrects the standard data of the computer component 20, so that the temperature setting or control takes place as if the temperature sensor 36 was not for constructional and operational reasons located in some marginal area, but instead at the thermal centre decisive for the product being baked.

Figure 2:
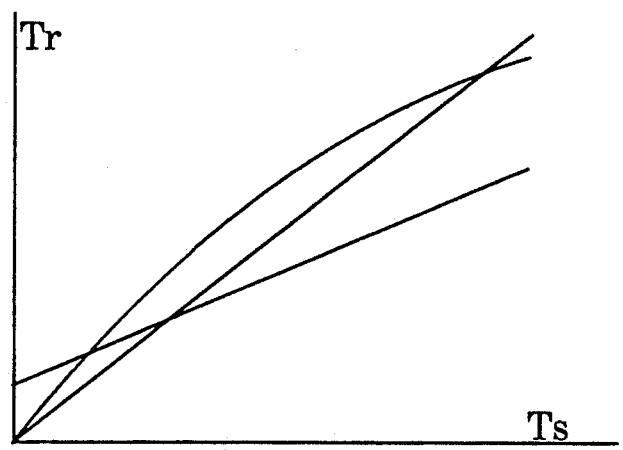

FIG. 2 shows examples of curves, which represent the data sets programmed into the memory 26. The control temperature Tr is plotted over the desired temperature Ts and it can be seen that these curves can have a starting point in the origin or zero point, can have corresponding zero shift or can be correspondingly curved curves, which can be fixed by corresponding data groups or by description by means of a mathematical function in the memory 26.

As stated, theoretically any baking oven can be individually corrected in this way. This correction would then replace an adjustment of the temperature regulator, e.g. by means of the set point adjuster 22. However, it is also possible to carry out a sampling adjustment of individual apparatuses from within the batch or series by redetermining the data stored in the memory 26 and to supply the latter by means of a random read-in unit with the corresponding data, i.e. to copy in the said data (variables). It is also possible to input the data in some way other than via the connection 32 provided for the standard display and input means 13, although this construction is particularly appropriate. It would also be possible to constructionally incorporate the memory 26 into the computer component.

We claim:

1. A regulator for an electric heating apparatus, comprising at least one temperature sensor associated with the electric heating apparatus, an electronic computer component and input means for the computer component for controlling the regulator during use, the input means being connected to the computer component via a connector;

a data line coming from an external source for communicating of additional process data, and a programmable, non-volatile memory operatively associated with the computer component for storing the additional process data;

the connector being a dual purpose connector, to which, in exchange for the input means, the data line can be connected, forming a read-in connection for inputting of the additional process data into the non-volatile memory.

2. A regulator according to claim 1, wherein the memory is separate from the computer component.

3. A regulator according to claim 1, wherein the computer component is a microcontroller.

4. A regulator according to claim 1 wherein the memory is adapted for storing parameters.

5. A regulator according to claim 4, wherein the memory is adapted to store different evaluation functions of temperature sensor data.

6. A regulator according to claim 5, wherein the sensor data comprise starting and end values, at least one set point adjustment range and curve parameters of associated temperature curves.

7. A regulator according to claim 1, wherein the memory for storing different additional process data groups is adapted for different operating modes of the electric heating apparatus.

8. A regulator according to claim 1, wherein the read-in connection is simultaneously the connection for the input means.

9. A regulator according to claim 1, wherein a read-in unit connected to the read-in connection is connected to a temperature measuring device, which measures real temperatures in the electric heating apparatus under different conditions as compared with the at least one temperature sensor and wherein the read-in unit is adapted for converting the dependence between the temperature values of the temperature sensor and the temperature measuring device into additional process data.

* * * * *